United States Patent [19]

Yamagishi et al.

[11] Patent Number: 4,736,284
[45] Date of Patent: Apr. 5, 1988

[54] SWITCHING POWER SUPPLY CIRCUIT INCLUDING FORWARD CONVERTER

[75] Inventors: Masaaki Yamagishi, Tokyo; Masahiko Shimizu, Yokohama, both of Japan

[73] Assignee: Kikusui Electronics Corp., Kawasaki, Japan

[21] Appl. No.: 947,505

[22] Filed: Dec. 29, 1986

[30] Foreign Application Priority Data

Jan. 14, 1986 [JP] Japan .................................. 61-5586

[51] Int. Cl.$^4$ .......................................... H02M 3/335
[52] U.S. Cl. ...................................... 363/16; 363/20; 363/24; 363/97
[58] Field of Search .................. 363/24, 25, 26, 16-21, 363/56, 97, 133, 134

[56] References Cited

U.S. PATENT DOCUMENTS 4,280,174 7/1981 Sonda .................................. 363/24

FOREIGN PATENT DOCUMENTS 3133578 3/1983 Fed. Rep. of Germany ........ 363/16
61-66562 5/1986 Japan .

OTHER PUBLICATIONS

The Switchmode Guide (Motorola), R. J. Haver, "The Designer's Guide for Switching Power Supply Circuits and Components", Motorola Semiconductor Products Inc.

*Primary Examiner*—Patrick R. Salce
*Assistant Examiner*—Kristine Peckman
*Attorney, Agent, or Firm*—Frishauf, Holtz, Goodman & Woodward

[57] ABSTRACT

In a switching power supply circuit, a forward converter includes first to third switching transistors and a switching transformer having first and second primary windings. The first to third switching transistors are connected via series-connected first and second primary windings to a high voltage DC source. While the first to third transistors are simultaneously turned off, magnetic fluxes induced in the switching transformer are completely reset.

10 Claims, 3 Drawing Sheets

SWITCHING POWER SUPPLY CIRCUIT INCLUDING FORWARD CONVERTER

BACKGROUND OF THE INVENTION

1. Field of the Invention

The present invention generally relates to a switching power supply circuit, and more particularly to a high-frequency converter arranged to operate at a high duty ratio.

2. Description of the Prior Art

Various types of switching power supply circuits have been developed as, for instance, forward converters, push-pull converters and bridge converters.

As is well known in the art, forward converters have particular advantages in that no asymmetrical flux swings, or dissymmetry phenomenon occurs, as compared with push-pull converters and bridge converters. In push-pull converters and bridge converters, generally, the asymmetrical flux swing phenomenon occurs during transition periods, in load fluctuations or in aging effects of switching transistors, because excited magnetic fluxes cannot be reset during turn-off periods of switching transistors.

FIG. 1 shows a typical double ended DC-to-DC forward converter.

A basic operation of the forward converter is as follows. An electric power is transferred from a primary circuit of a switching transformer to a secondary circuit thereof during turn-on periods of switching transistors. These switching transistors are simply represented by switch contacts. An exciting energy of the switching transformer is reset during turn-off periods of the switching transistors.

The magnetic excitation in the switching transformer will be simply explained. When a voltage $E_i$ of a DC power supply 11 is applied to the switching transformer having the primary winding of a turn number $n_1$ for only a time period $T_{on}$, a magnetic flux $\phi_{set}$ generated in the core of the switching transformer is given by the following equation (1).

$$\phi_{set} = \frac{1}{n_1} \cdot E_i \cdot T_{on} \quad (1)$$

That is, the magnetic flux $\phi_{set}$ is given by the product of applied voltage $E_i$ and period "$T_{on}$" for applying this voltage and is equivalent to an electric power which passes through the switching transformer. In other words, a total amount of magnetic flux $\phi_{set}$ is not influenced by the electric power which is transferred to the secondary winding.

A typical magnetic material has a limit value which is defined by the maximum magnetic flux density. This flux density is equal to a value which is obtained by dividing the produced magnetic flux by the effective sectional area of the core, and is namely, the magnetic flux per unit area. If the magnetic material is excited to a value in excess of the limit value, it will be saturated and therefore the permeability of the magnetic material will promptly decrease. Thus, the inductance of the primary winding is rapidly approximated to the inductance of the air-core coil, so that the switching transformer utilizing such a magnetic material will fail to perform its transformer function.

Therefore, the magnetic flux excited during the preceding turn-on ($T_{on}$) period needs to be firmly reset during the turn-off ($T_{off}$) period of a switching transistor.

For a better understanding of the foregoing fundamental operation, the operation of the double ended type DC-to-DC forward converter in FIG. 1 will now be explained hereinbelow.

The conventional DC-to-DC forward converter includes first and second switching transistors 1A and 1B, a switching transformer 8 having a primary winding 3 and a secondary winding 5; and first and second feedback diodes 2A and 2B. The first and second switching transistors 1A and 1B are series-connected to the primary winding 3 of the switching transformer 8. The first and second feedback diodes 2A and 2B are connected between the DC power supply 11 and the corresponding switching transistors 1A and 1B in such a manner that the reverse current can be fed back, or returned to DC power supply 11 namely to the forward converter during the turn-off periods of the switching transistors 1A and 1B. To the secondary winding 5, a rectifier and smoothing filter circuit having a rectifier diode 4 is connected to derive a DC output. The turn number of the primary winding 3 is selected to be n1, whereas that of the secondary winding 5 is n2.

The fundamental operation of the forward converter in the double ended DC-to-DC forward converter having the above circuit arrangement will now be explained.

In the converter in FIG. 1, when both switching transistors 1A and 1B are turned off, the counter electromotive force which has been generated in primary winding 3 of switching transformer 8, is returned to DC power supply $E_i$ diodes 2A and 2B, so that the voltage across primary winding 3 is clamped to the power source voltage and the excited magnetic flux is reset.

A magnetic flux $\phi_{res}$ to be reset is given by the following equation (2).

$$\phi_{res} = \frac{1}{n_1} \cdot E_i \cdot T_{off} \quad (2)$$

Therefore, the condition regarding the magnetic excitation necessary to make the converter in FIG. 1 operative will be given by:

$$\phi_{set} \leq \phi_{res} \quad (3)$$

By substituting the equations (1) and (2) for the inequality (3), we have $$\frac{1}{n_1} \cdot E_i \cdot T_{on} \leq \frac{1}{n_1} \cdot E_i \cdot T_{off} \quad (4)$$

The theoretical limit value of the duty ratio $$\left( \frac{T_{on}}{T_{on} + T_{off}} \times 100\% \right) \text{ is } 50\%,$$

since $T_{on} \leq T_{off}$. However, the theoretical limit value is practically reduced to a value of up to 30 to 40% due to safety reasons.

The single transistor converter shown in FIG. 2 is of the type in which a switching transformer 9 has a third winding 6 for resetting the magnetic excitation. In the above prior art converter, the magnetic flux excited is returned to DC power source $E_i$ through a diode 2C.

Magnetic flux $\phi_{res}$ to be reset in this case is given by the following equation (5).

$$\phi_{res} = \frac{1}{n_3} \cdot E_i \cdot T_{off} \quad (5)$$

As can be understood from this equation, when a turn number $n_3$ of third winding 6 is reduced, the magnetic flux can be sufficiently reset even if the turn-off period $T_{off}$ is reduced.

As an example, assuming that a turn ratio is set to $n_3=0.5n_1$, the limit value of the duty ratio will amount to approximately 67%.

However, since primary and third windings 3 and 6 are magnetically coupled to each other in switching transformer 9, when diode 2C is turned on and the voltage across third winding 6 is clamped to the power source voltage of $-E_i$ while switching transistor 1 is turned off, a great counter electromotive force given below is generated in primary winding 3.

$$\frac{n_1}{n_3} \cdot E_i = 2E_i \quad (6)$$

This counter electromotive force is superimposed on voltage $E_i$ of DC power supply 11 and applied to a switching transistor 1, so that the total voltage inevitably becomes:

$$\left(1 + \frac{2}{n_3}\right) \cdot E_i + 3E_i \quad (7)$$

However, as described above, the conventional forward converters in FIGS. 1 and 2 have an advantage such that the excited energy can be reset during the turn-off period of the switching transistor. In other words, the forward converter has an advantage such that there is no saturation of the core of the switching transformer by an asymmetrical flux swing which causes a problem in the conventional push-pull type or bridge type converter. Nevertheless, there are drawbacks such that the duty ratio cannot exceed 50% and the efficiency of the switching transformer cannot be effectively increased.

In addition, such a forward converter is generally operated at a high input voltage, e.g., at a DC voltage of 200 to 370 V and further performs the switching operation at a high frequency on the order of, e.g., 100 kHz. Therefore, if the forward converters as shown in FIGS. 1 and 2 are made operative by use of commercially available switching transistors, the duty ratio cannot be sufficiently great, and there is the risk such that these transistors are broken down by the counter electromotive voltage, which is about three times as high as the power source voltage as mentioned above.

In addition, there is also another problem such that if the commercially available switching transistors of reasonable prices are employed, the design of the circuit elements and operating conditions will be limited, due to the foregoing problems.

It is, therefore, an object of the present invention to provide a switching power supply circuit in which the duty ratio can exceed 50%, the asymmetrical flux swing (DC excitation) phenomenon does not occur, and the magnetic flux excited during the switching-on periods can be sufficiently reset.

It is another object of the invention to provide a switching power supply circuit which can perform the switching operation at a high source voltage and at a high frequency.

SUMMARY OF THE INVENTION

These objects of the invention are accomplished by providing a switching power supply circuit comprising:

forward converter means coupled to a DC (direct current) power supply means having positive and negative terminals;

said forward converter means including:

(1) switching transformer means having first and second primary windings and a secondary winding magnetically coupled to the first and second primary windings, the first and second primary windings being coupled in series with the positive and negative terminals of the DC power supply means;

(2) first switching means connected between the positive terminal and one end of the first primary winding;

(3) second switching means connected between the other end of the first primary winding and one end of the second primary winding;

(4) third switching means connected between the other end of the second primary winding and the negative terminal, the first, second and third switching means being series-coupled via said series-connected first and second primary windings to the DC power supply means, and being substantially simultaneously turned on/off; and (5) means coupled between each end of the first and second primary windings and the DC power supply means, for returning to the DC power supply means a counter-electromotive force induced in said first and second primary windings, while said first to third switching means are substantially simultaneously turned off, whereby electromagnetic fluxes induced in the switching transformer means are reset during a turning-off period of said first to third switching means.

BRIEF DESCRIPTION OF THE DRAWINGS

For a better understanding of these objects and other objects of the present invention, reference is made to the following detailed description of the invention to be read in conjunction with the following drawings, in which.

DETAILED DESCRIPTION OF PREFERRED EMBODIMENT

CIRCUIT ARRANGEMENT OF FIRST FORWARD CONVERTER

Figure 3:
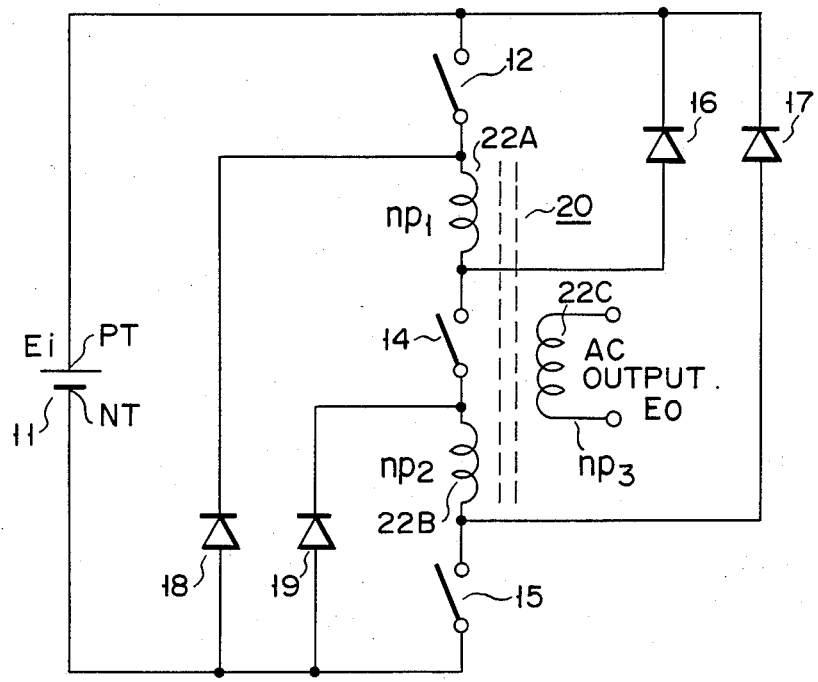
FIG. 3 is a circuit diagram of a DC-to-AC forward converter according to a first preferred embodiment of the invention.

Referring now to FIG. 3, a first DC-to-AC forward converter according to the invention will be described. The first forward converter includes a series connection between both ends (positive and negative terminals) of DC power supply 11. This series connection is constructed of a first switching element 12; a first primary winding 22A of a switching transformer 20; a second switching element 14; a second primary winding 22B of switching transformer 20; and a third switching element 15.

Switching elements 12, 14, and 15 may be, e.g., switching transistors and are simultaneously turned on or off by a control circuit (not shown in detail).

Switching transformer 20 has two sets of primary windings 22A and 22B having turn numbers "$np_1$" and "$np_2$" which are electrically equal to each other, and a secondary winding 22C having the turn number "$np_3$".

A series connection point of second switching element 14 and first primary winding 22A and series connection point of third switching element 15 and second primary winding 22B are connected to a positive polarity terminal PT of DC power source 11 through feedback diodes 16 and 17 in the forward directions, respectively.

On the other hand, a series connection point of first switching element 12 and first primary winding 22A and a series connection point of second switching element 14 and second primary winding 22B are connected to a negative polarity terminal NT of DC power source 11 through feedback diodes 18 and 19 in the opposite directions, respectively.

SWITCHING OPERATION

In the power supply circuit in FIG. 3, when switching elements 12, 14, and 15 are substantially simultaneously turned on, voltage $E_i$ of DC power supply 11 is applied to first and second primary windings 22A and 22B of switching transformer 20.

Magnetic flux $\phi_{set}$ which is accumulated in the core of switching transformer 20 during on-time period $T_{on}$ is given by the following equation (8) similarly to the equation (1) when the turn-on time of the switching transistor assumes "$T_{on}$".

$$\phi_{set} = \frac{1}{(np_1 + np_2)} \cdot E_i \cdot T_{on} \qquad (8)$$

When switching elements 12, 14, and 15 are turned off, the current flowing through primary windings 22A and 22B cannot be suddenly turned off because of the inductance of the primary winding itself, as is well known, but is intended to continuously flow.

That is, the counter electromotive forces occur in primary windings 22A and 22B. The counter electromotive force generated in first primary winding 22A forwardly biases feedback diodes 16 and 18, and the voltage across first primary winding 22A is clamped by voltage $E_i$ of DC power supply 11 and then, the primary current is returned to power supply 11.

Similarly, the counter electromotive force generated in second primary winding 22B forwardly biases diodes 17 and 19, and the voltage across second primary winding 22B is clamped by voltage $E_i$ of DC power supply 11 and then, the primary current is returned to power supply 11.

As a result, the voltage which is applied while switching elements 12, 14, and 15 are in the OFF state does not exceed voltage $E_i$ of power supply 11.

On the other hand, magnetic flux $\phi_{res}$ which is reset while the switching elements are in the OFF state is given by:

$$\phi_{res} = \frac{1}{np_1} \cdot E_i \cdot T_{off} \qquad (9)$$

Equation (9) is based on the fact that when switching elements 12, 14, 15 are turned off, a fly-back voltage is produced, and primary windings 22A and 22B are clamped with the same voltage $E_i$. That is, a reverse current flows from primary windings 22A, 22B to power source 11, since primary windings 22A and 22B form an equivalent parallel circuit. At this time, the fluxes passing through the core of the switching transformer reduce. The reduction of fluxes is described as "reset", and the following Faraday law is established:

$$|\epsilon| = \frac{d\phi}{dt} np_1 = np_2$$

$$\phi = \frac{1}{np_1} E_i dt = \frac{1}{np_2} E_i dt$$

$\phi$: interlinkage fluxes $\epsilon$: electromotive force

The reset does not occur by forcefully applying a voltage from an external circuit, but by emitting an energy due to fly-back voltage generated from the transformer. Such resetting can be realized in the secondary side as well as in the primary side.

$$\frac{ns}{np_1 + np_2} = \frac{E_s}{E_i}$$

Es: voltage produced in secondary winding
Ei: voltage produced in primary winding
ns: number-of-turns of secondary winding
np1: number-of-turns of first primary winding
np2: number-of-turns of second primary winding.

In the present embodiment, a clamp circuit for a fly-back transformer is provided on the primary side.

Where $np_1 = np_2$, the exciting condition necessary to make the DC-to-AC converter shown in FIG. 3 normally operative is shown by the equation (3).

$$\phi_{set} \leqq \phi_{res} \qquad (3)$$

By substituting the equations (8) and (9) for the inequality (3) and by setting $np_1 = np_2$, $$\frac{1}{2np_1} \cdot E_i \cdot T_{on} \leqq \frac{1}{np_1} \cdot E_i \cdot T_{off} \qquad (10)$$

Therefore, $T_{on} \leqq 2T_{off}$ \qquad (11)

next, by substituting the condition obtained from the equation (11), i.e., $(\frac{1}{2})T_{on} = T_{off}$ for the equation of the duty ratio as previously mentioned, we have $$\frac{T_{on}}{T_{on} + (\frac{1}{2})T_{on}} \times 100\% \tag{12}$$

Therefore, the limit value of the duty ratio is about 66.7%. As compared with the duty ratios of the converters illustrated in FIGS. 1 and 2, the duty ratio of this first forward converter can be remarkably reduced for the turn-off period. In other words, according to the present embodiment, there is an important feature such that magnetic flux $\phi_{res}$ which can be completely reset while switching elements 12, 14, and 15 are in the off state can be remarkably reset within a short time (30% versus 67%).

As mentioned, above, there is another feature such that the counter electromotive voltage in the off state can be suppressed to a low voltage, i.e., power source voltage $E_i$.

According to the present embodiment, the turn-on periods of switching elements 12, 14, and 15 can be set to the long periods. Therefore, there is still another feature such that the power transmission efficiency from the primary circuit to the secondary circuit of switching transformer 20 is remarkably improved.

Figure 1:
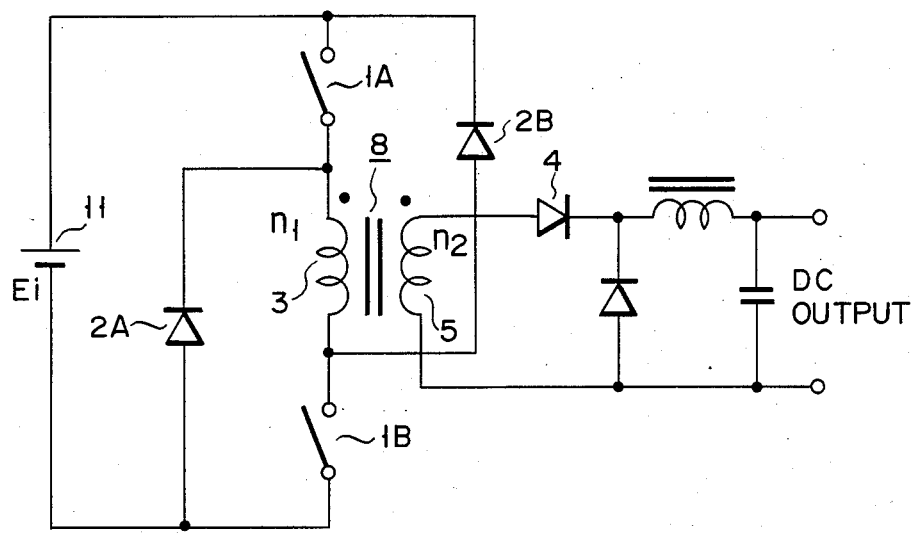
FIG. 1 is a circuit diagram of a conventional double ended DC-to-DC forward converter.
Figure 2:
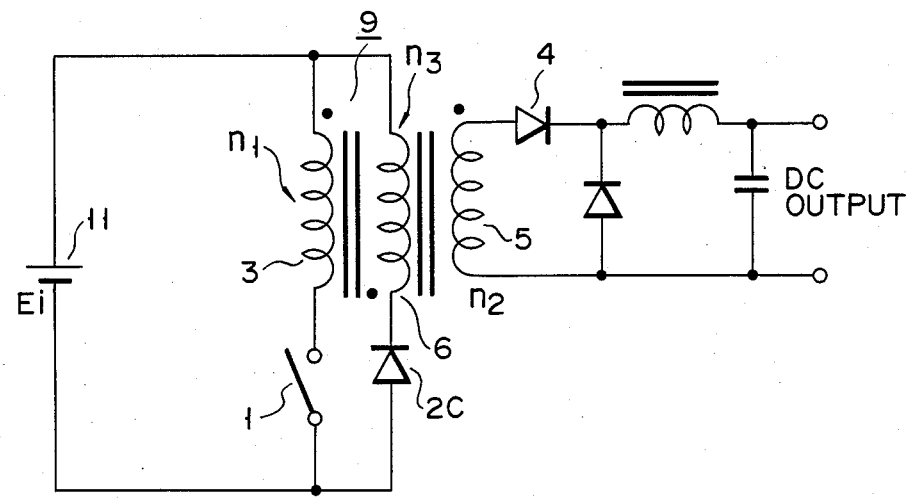
FIG. 2 is a circuit diagram of a prior art single transistor DC-to-DC forward transistor.
Figure 4A:
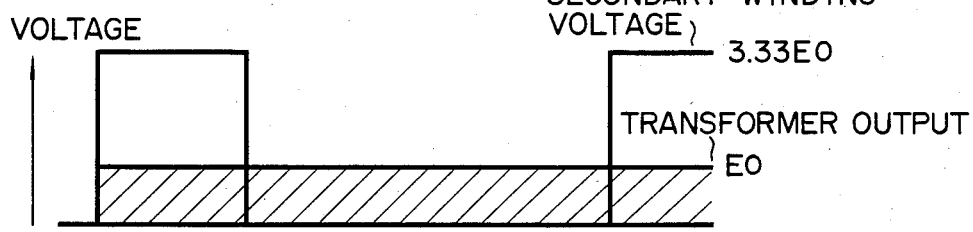
FIG. 4A shows waveforms of secondary winding voltage and transformer output voltage derived from the conventional forward converter shown in FIG. 1.
Figure 4B:
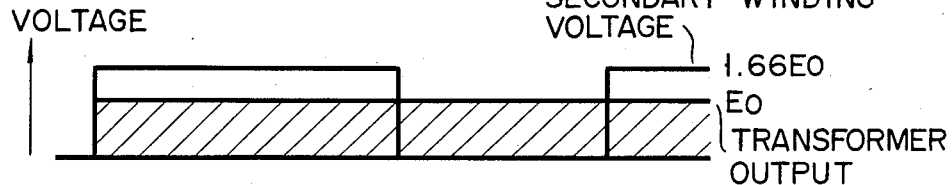
FIG. 4B illustrates waveforms of secondary winding voltage and transformer output voltage derived from the forward converter shown in FIG. 3.

Therefore, in the case of producing the same output voltage $E_0$ by the forward converter as that by the conventional forward converter, illustrated in waveforms of FIG. 4, the voltage of the secondary winding becomes 3.33 $E_0$ in the conventional forward converter which operates the duty ratio of 30% (FIG. 1). As compared with this conventional example, in the forward converter of the preferred embodiment of FIG. 3 having the duty ratio of, e.g., 60%, it is sufficient to design the voltage of the secondary winding to 1.66 $E_0$.

Thus, the turn number of secondary winding 22C can be reduced to about half as compared with the conventional one. The inductance of a smoothing choke coil, which will be explained hereinafter, in the output circuit of the converter can be also reduced by one half.

Further, the circuit arrangement of the present invention can be accomplished by merely adding, for example, one switching transistor and two feedback diodes to the conventional forward converter and the simple circuit arrangement with high power efficiency is also realized. The forward converter in the present embodiment can be stably operated at the duty ratio of 60% without generating any DC exciting flux. For example, if there is no change in the electric power capacity of the materials of the switching elements, switching transformer, and the like, the electric power which is about 1.5 times larger than that of the conventional forward converter having the duty ratio of 40% can be supplied to the load.

CIRCUIT ARRANGEMENT OF SECOND FORWARD CONVERTER

Figure 5:
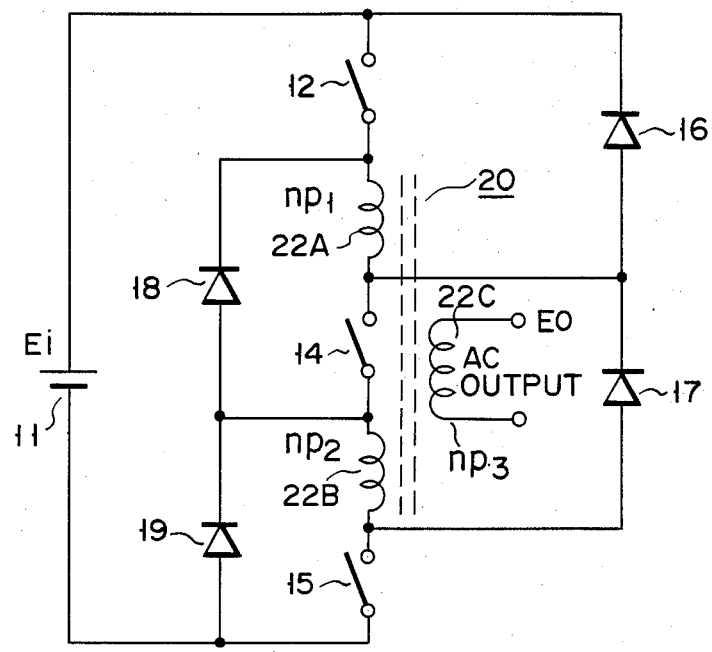
FIG. 5 is a circuit diagram of a DC-to-AC forward converter according to a second preferred embodiment of the invention; and, FIG. 6 is a circuit diagram of a practical DC-to-DC forward converter according to a third preferred embodiment of the invention.

Referring now to FIG. 5, a second DC-to-AC forward converter will be described. As is easily understood from the circuit of this second forward converter, all of the circuit elements are identical to those employed in the circuit of the first forward converter shown in FIG. 3. The cathode of feedback diode 17 of is, however, to the anode of feedback diode 16, whereas the anode of feedback 18 is connected to the cathode of feedback diode 19. The remaining circuit portion of the second forward converter is identical to that of the first forward converter. Thus, the second forward converter can be operated in a similar manner to the first forward converter.

As described above, according to the invention, the duty ratio can be increased without the core saturation. Thus, it is possible to provide a switching power supply circuit which can improve the power efficiency of the switching transformer, can reduce the withstanding voltage of the switching element, and can supply a large electric power to a load.

Further, according to the invention, it is possible to provide a switching power supply circuit which can perform the switching operation at an input voltage of a high main voltage of, e.g., 200 to 240 V and at a high frequency of, e.g., 100 kHz.

In addition, according to the invention, the counter electromotive voltage which is generated during the turn-off period of the swiching elements can be considerably reduced. Thus, there is an advantage such that cheaper switching elements can be used.

PRACTICAL CIRCUIT DESIGN

Figure 6:
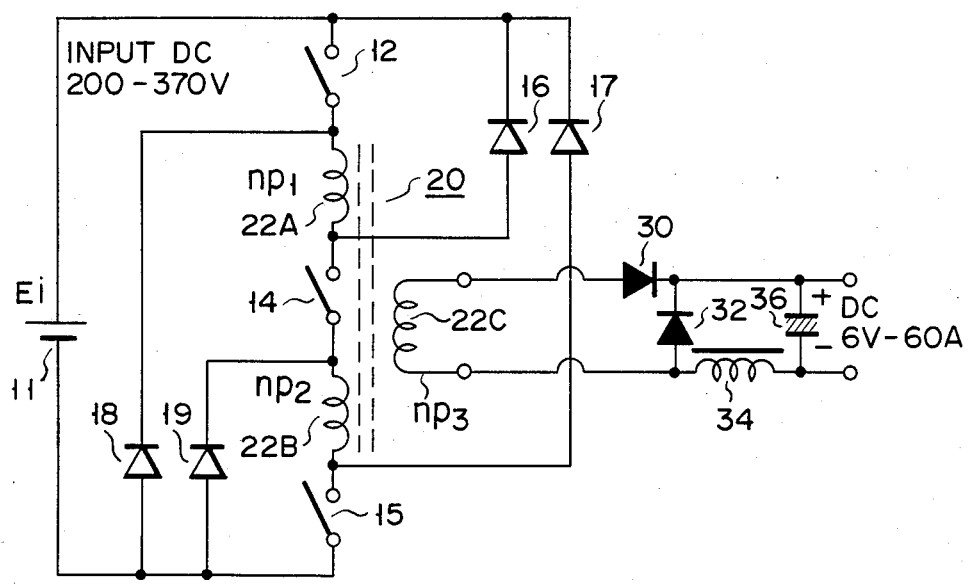

FIG. 6 shows a practical circuit of a DC-to-DC forward converter according to the present invention.

As will be obvious from this circuit diagram, a filtering circuit connected to secondary winding 22C of switching transformer 20 is coupled with the DC-to-AC forward converter of FIG. 3. This filtering circuit comprises rectifier diodes 30 and 32; a choke coil 34; and a filtering capacitor 36. Such a rectifier and smoothing circuit itself is well known.

The third forward converter according to the invention employs the following circuit components.

TABLE

| | |
|---|---|
| Input voltage (AC) | 200–240 V ± 10% |
| Input voltage (DC) | 200–370 V |
| switching FETs 12, 14, 15 | 2SK 559 |
| | (available from |
| | Hitachi) 450 V 15 A |
| switching transformer 20 | PQ 35/35 H7Cl |
| | (ferrite core of |
| | TDK) |
| primary windings $n_{p1}$, $n_{p2}$ | :22 turns |
| secondary winding $n_{p3}$ | :3 turns |
| feedback diodes 16 to 19 | RG 4, 400 V 2.4 A |
| | (available from |
| | SHINDENGEN K.K.) |
| rectifier diodes 30, 32 | C80 HO 40 |
| | 40 V 80 A |
| | (available from |
| | NIHON INTERNATIONAL |
| | RECTIFIER K.K.) |
| Choke coil 34 | 6 μH 60 A |
| filtering capacitor 36 | 10 V |
| | 10,000 μF × 6 pcs. |
| switching frequency | approx. 100 KHz |

The DC-to-DC forward converter employing such components has a feature such that it is operative at a high input voltage of 200 to 370 DCV and at a high frequency of the order of 100 kHz.

In this case, there is an advantage such that the components used in this DC-to-DC forward converter are all inexpensive and easily commercially available.

While the present invention has been described in terms of certain preferred embodiments, and exemplified with respect thereto, those skilled in the art will readily appreciate that various modifications, changes, omissions, and substitutions may be made without departing from the spirit and scope of the invention.

For example, as switching elements, not only bipolar transistors but also FETs can be used. On the other hand, any type of diodes can also as used as the feedback and rectifier diodes if they have good high frequency characteristics. For example, Schottky diodes can be also used.

What is claimed is:

1. A switching power supply circuit comprising:
   forward converter means coupled to a DC (direct current) power supply means having positive and negative terminals;
   said forward converter means including:
   (1) switching transformer means having first and second primary windings and a secondary winding magnetically coupled to said first and second primary windings, said first and second primary windings being coupled in series with said positive and negative terminals of the DC power supply means;
   (2) first switching means connected between said positive terminal and one end of the first primary winding;
   (3) second switching means connected between the other end of the first primary winding and one end of the second primary winding;
   (4) third switching means connected between the other end of the second primary winding and the negative terminal, said first, second and third switching means being series-coupled via said series-connected first and second primary windings to the DC power supply means, and arranged to be substantially simultaneously turned on/off; and
   (5) means coupled between each end of said first and second primary windings and the DC power supply means, for returning to the DC power supply means a counterelectromotive force induced in said first and second primary windings, while said first to third switching means are substantially simultaneously turned off, wherein electromagnetic fluxes induced in the switching transformer means are reset during a turning-off period of said first to third switching means.

2. A circuit as claimed in claim 1, wherein said counterelectromotive-force-returning means are diode means.

3. A circuit as claimed in claim 2, wherein said diode means are Schottky diodes.

4. A circuit as claimed in claim 1, wherein said first and second primary windings of the switching transformer means have the same turn numbers.

5. A circuit as claimed in claim 1, wherein said first to third switching means are bipolar transistors.

6. A circuit as claimed in claim 5, wherein said bipolar transistors have a withstanding voltage of approximately 450 V and a switching frequency of approximately 100 KHz.

7. A circuit as claimed in claim 1, wherein said first to third switching means are field-effect transistors.

8. A circuit as claimed in claim 7, wherein said field-effect transistors have a withstanding voltage of approximately 450 V and a switching frequency of approximately 100 KHz.

9. A circuit as claimed in claim 1, wherein said forward converter means is connected to a DC power supply capable of applying DC voltages approximately from 200 to 370 volts.

10. A circuit as claimed in claim 1, further comprising:
    rectifier and filtering means connected to said secondary winding of the switching transformer means, for rectifying and filtering AC (alternating current) output from the secondary winding thereof to derive a DC output voltage, wherein said forward converter means is arranged to operate as a DC-to-DC forward converter.

* * * * *